A. SEARLS.

Improvement in Prop-Joints for Carriages.

No. 131,568. Patented Sep. 24, 1872.

Witnesses
William M Cook
Ephraim Becut

Inventor
Anson Searls

UNITED STATES PATENT OFFICE.

ANSON SEARLS, OF NEWARK, NEW JERSEY.

IMPROVEMENT IN PROP-JOINTS FOR CARRIAGES.

Specification forming part of Letters Patent No. 131,568, dated September 24, 1872.

*To all whom it may concern:*

Be it known that I, ANSON SEARLS, of Newark, State of New Jersey, have invented certain Improvements in "Prop-Joints" for Carriages, of which the following is a specification:

The nature and objects of my invention consist in the construction of the knuckle of prop-joints by increasing the strength at that part, so that the same may be cast of malleable-iron or cast converted steel and be as reliable as the wrought-iron joints in use, and is intended as an improvement of the "center-joint" patented November 5, 1867. It also consists in making the eye that goes upon the top-prop separate from the joints, and provided with a socket and set-screw by which it may be attached to the joint.

Figure 1:
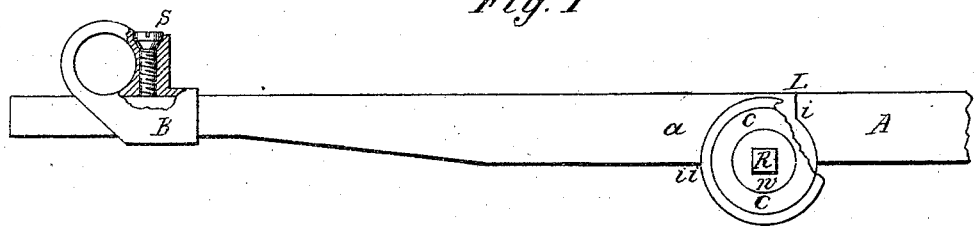
Figure 2:
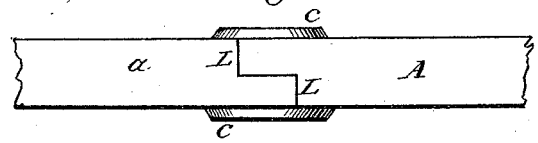
Figure 3:
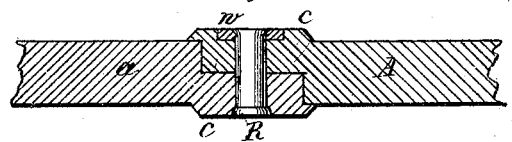

Figure 1 is a view of the prop-joint *a* A and of the eye B, and set-screw S in section. The joint parts *a* A are provided with a raise like a rivet-head, *c c*, that is cut away at *i* to show the joint between the parts *a* A at L. Fig. 2 is a back view of the prop-joint, showing the joint L L. Fig. 3 is a sectional view of the parts.

Cast-steel castings are now made with great tensile strength and stiffness, and may be used to great advantage in prop-joints where lightness and strength are desirable. To make cast-steel castings, as well as malleable-iron prop-joints, as reliable as wrought-iron, I increase the strength in the knuckle-joint by making the parts *a* A, as shown in Fig. 2, with the division of the hinge not in the center, but the knuckle part *a* extending over past the center to the line L, and A extending over the other side in like manner; thereby increasing the quantity of metal in the weak point—that is, from *i i* to *i*, and consequently increasing the strength. To still further increase the strength of those parts I make the cap or raise C, that resembles a rivet-head, a part of both knuckles *a* A. (See Fig. 2.) The knuckle is held together by the rivet R, which may be made a part of either knuckle, or any well-known shape, but should be riveted into the washer W, Figs. 1 and 3, to prevent the action of the knuckles from wearing the burr off. The washer W is provided with a square hole so that it cannot turn when on the rivet, and, to make a good finish, should be inserted in the knuckle, as shown by Fig. 3.

Prop-joints have been made of malleable-iron but proved impracticable from the nature of the knuckle-joint used at that time.

Where manufacturers construct their tops all of uniform shape and size the prop-joints may be made of malleable-iron or cast-steel, converted with the foregoing-described knuckle, all of one exact length. But to render the same suitable to the general trade and great amount of variation required in the lengths, I make the eye B, that goes on the top-prop, with a transverse socket on one side of the eye, through which the outer end of the joint passes and is held in place by the set-screw S, as shown in Fig. 1. The prop-joint *a* may be screwed into the eye B instead of sliding in the transverse hole or socket, for the prop-joint may be directly opposite the center of the eye-hole instead of one side. It may be held by the set-screw S, as shown, or by a tapering nut screwing onto the outside of the socket and compressing it onto the prop-joint. The tapering nut may be made like the socket described in my patent of November 5, 1867, and screw onto the extension-joint in such a manner as to compress and hold the parts in place.

Claims.

1. A cast knuckle-joint constructed of the parts *a* A extending past the centers, as and for the purposes set forth.

2. I claim the washer W when used in combination with the parts *a* A and rivet R, or equivalents, as described.

3. I claim the joint-eye B, with the transverse socket on one side for the prop-joint, and fastened by a set-screw or equivalent, as and for the purpose set forth.

4. I claim, as an article of manufacture, a malleable-iron or cast converted steel prop-joint, constructed as and for the purpose set forth, or in equivalent manner.

ANSON SEARLS.

Witnesses:
WILLIAM M. COOK,
EPHRAIM BRENT.